US008660524B2

(12) United States Patent
Cloutier et al.

(10) Patent No.: US 8,660,524 B2
(45) Date of Patent: *Feb. 25, 2014

(54) ENFORCING LIMITS ON FREE AND/OR DISCOUNTED ELECTRONIC COMMUNICATIONS

(71) Applicant: Pinger, Inc., San Jose, CA (US)

(72) Inventors: Jocelyn Cloutier, Menlo Park, CA (US); Joseph Sipher, Sunnyvale, CA (US); Elita Ng, Mountain View, CA (US)

(73) Assignee: Pinger, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,969

(22) Filed: May 29, 2013

(65) Prior Publication Data
US 2013/0281052 A1    Oct. 24, 2013

Related U.S. Application Data

(63) Continuation of application No. 13/461,546, filed on May 1, 2012, now Pat. No. 8,478,252.

(60) Provisional application No. 61/486,321, filed on May 15, 2011.

(51) Int. Cl.
*H04M 11/00* (2006.01)

(52) U.S. Cl.
USPC .......................................................... 455/406

(58) Field of Classification Search
USPC ................ 455/414.1, 406, 414.2; 705/39, 14, 705/14.16, 14.73, 756, 14.25
See application file for complete search history.

(56) References Cited

U.S. PATENT DOCUMENTS

| | | |
|---|---|---|
| 2007/0249330 A1 | 10/2007 | Cortegiano et al. |
| 2008/0080681 A1 | 4/2008 | Burgan et al. |
| 2008/0228572 A1 | 9/2008 | Teterin |
| 2009/0076917 A1 | 3/2009 | Jablokov et al. |
| 2010/0003963 A1 | 1/2010 | Aaltonen et al. |
| 2010/0184404 A1 | 7/2010 | Timmons |
| 2011/0153437 A1 | 6/2011 | Archer et al. |

*Primary Examiner* — Kiet Doan
(74) *Attorney, Agent, or Firm* — Raubvogel Law Office

(57) ABSTRACT

Limits are placed on the number of free and/or discounted communications (such as voice calls and text messages) available to a user, based on the number of communications received by the user. A user is given an allotment of credits, each worth one or more free and/or discounted communications. A credit balance is established and is continually adjusted as follows: it is increased whenever qualifying communications of a given type are received, and is decreased whenever free and/or discounted communications of the given type are initiated by the user. Once the credit balance has been depleted, the user may be blocked from initiating additional free or discounted communications, until the credit balance is increased. In at least one embodiment, different types of credits can be earned and/or used for different types of communications. In at least one embodiment, exchanges between the different types of credits may be permitted.

35 Claims, 10 Drawing Sheets earning points

+10 per sms received
+40 per minute inbound call            901 rates 10 per sms
40 per minute landline call            902
100 per minute mobile call International rates            903

ENFORCING LIMITS ON FREE AND/OR DISCOUNTED ELECTRONIC COMMUNICATIONS

CROSS-REFERENCE TO RELATED APPLICATION

The present application claims priority as a continuation of U.S. Utility application Ser. No. 13/461,546 for "Enforcing Limits on Free and/or Discounted Electronic Communications," filed May 1, 2012, which claimed priority from U.S. Provisional Application Ser. No. 61/486,321 for "Enforcing Limits on Free Electronic Communications," filed May 15, 2011. The disclosures of both cases are incorporated herein by reference.

FIELD OF THE INVENTION

The present invention relates to electronic communications, and more particularly to a system and method for enforcing limits on free and/or discounted electronic communications.

DESCRIPTION OF THE RELATED ART

For many forms of electronic communication, particularly those involving wireless communication devices, both the sender and the recipient of a communication are billed. For other forms, only the sender may be billed. Such payment arrangements vary from country to country, carrier to carrier, as well as from plan to plan for a particular carrier. For example, in the United States, it is common for both a caller and a recipient of a wireless telephone call to be billed for the call (either by paying per-minute or by using some portion of an allotment of minutes available to the subscriber). Similarly, in the United States, text messages are typically billed to both the sender and recipient.

By contrast, in many other countries, only the sender or caller pays for such communication, and the recipient is not billed for receiving the communication. The costs associated with receiving the communication are borne by the recipient's carrier. Carriers may negotiate with one another so that receiving costs are charged back to sending carriers. If one carrier tends to send more communications and another tends to receive more, the former may compensate the latter for the difference. In most cases, the number of communications received by a carrier will approximately equal the number of communications sent (or initiated) by that carrier, so that the compensation amounts are relatively small or none. In general, the arrangements between carriers rely on some approximation of symmetry between incoming and outgoing communications.

Traditionally, users can purchase text plans that allow for a certain number of text messages and/or voice minutes per month or per year, or that allow for unlimited texting and/or voice calls. However, plans that offer large numbers of messages and/or minutes are often quite expensive, and many users would benefit from an alternative arrangement wherein text messages and/or voice calls could be made for free or for reduced rates.

Some software applications ("apps") allow users to make calls and/or send text messages for free. Generally, such applications are supported by mobile advertising, so that the cost of a message or voice call is offset by paid advertising presented to the sender. An example of such an application is Textfree with Voice, available from Pinger, Inc. of San Jose, Calif.

The ability to initiate communications for free can lead to asymmetry in the number of communications sent and received. A user who has the ability to initiate a communication for free using an ad-supported application avoids paying the cost of initiating the communication, but the receiving carrier still has to bear the cost of receiving the communication. The receiving carrier may not wish to bear such a cost if it knows that it is likely to receive more communications than it sends.

Such a situation may occur, for example, if one carrier provides ad-supported communications and another does not: the carrier that does not provide the ad-supported communications may find that it receives more communications than it sends, because of the incentives created by carriers that provide ad-supported communications. Such asymmetry can cause the negotiated arrangement among carriers to fail, since some carriers bear more costs than others. This can lead to some carriers refusing to accept communications from some other carriers, because the carriers have no assurance that they will be adequately compensated for the cost of receiving communications.

SUMMARY

According to various embodiments of the present invention, mechanisms are provided for enforcing a degree of symmetry in sending and receiving of communications, including for example voice calls and text messages sent via a mobile communications device, so as to place limits on the number of free and/or discounted communications available to a user. A user is given an allotment of credits, each worth one or more free and/or discounted communications; for example, each credit may be worth one or more text messages or one or more minutes of voice calls. For example, a user can be given an initial allotment of 10 credits, each worth one text message. Once the credit balance has been established, it is continually adjusted based on how many communications of a particular type a user has initiated, and how many the user has received. The credit balance is increased whenever qualifying communications are received, on the assumption that the carrier will be able to recoup the receiving costs from the sending carrier. The credit balance is decreased whenever free and/or discounted communications are initiated by the user. Once the credit balance has been depleted, the user may be blocked from initiating additional communications for free and/or at discounted rates, until the credit balance is increased by receiving communications or by some other means.

In at least one embodiment, different types of credits can be earned and/or used for different types of communications. Exchanges between the different types of credits may be permitted, in at least one embodiment, at predefined exchange rates.

In at least one embodiment, the system and method of the present invention are implemented on mobile communication devices, with support and resources provided by one or more servers, which may be located remotely with respect to the communication devices. The system and method of the present invention can be implemented using software running on such mobile communications devices, or on servers that handle communications initiated by such devices, or on any combination thereof.

In at least one embodiment, the system and method of the present invention include a platform for initiating and/or receiving electronic communications, and for handling billing for such communications. Such a platform may be implemented as an application programming interface (API) that allows third parties to configure and use the system.

Further details and variations are described herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
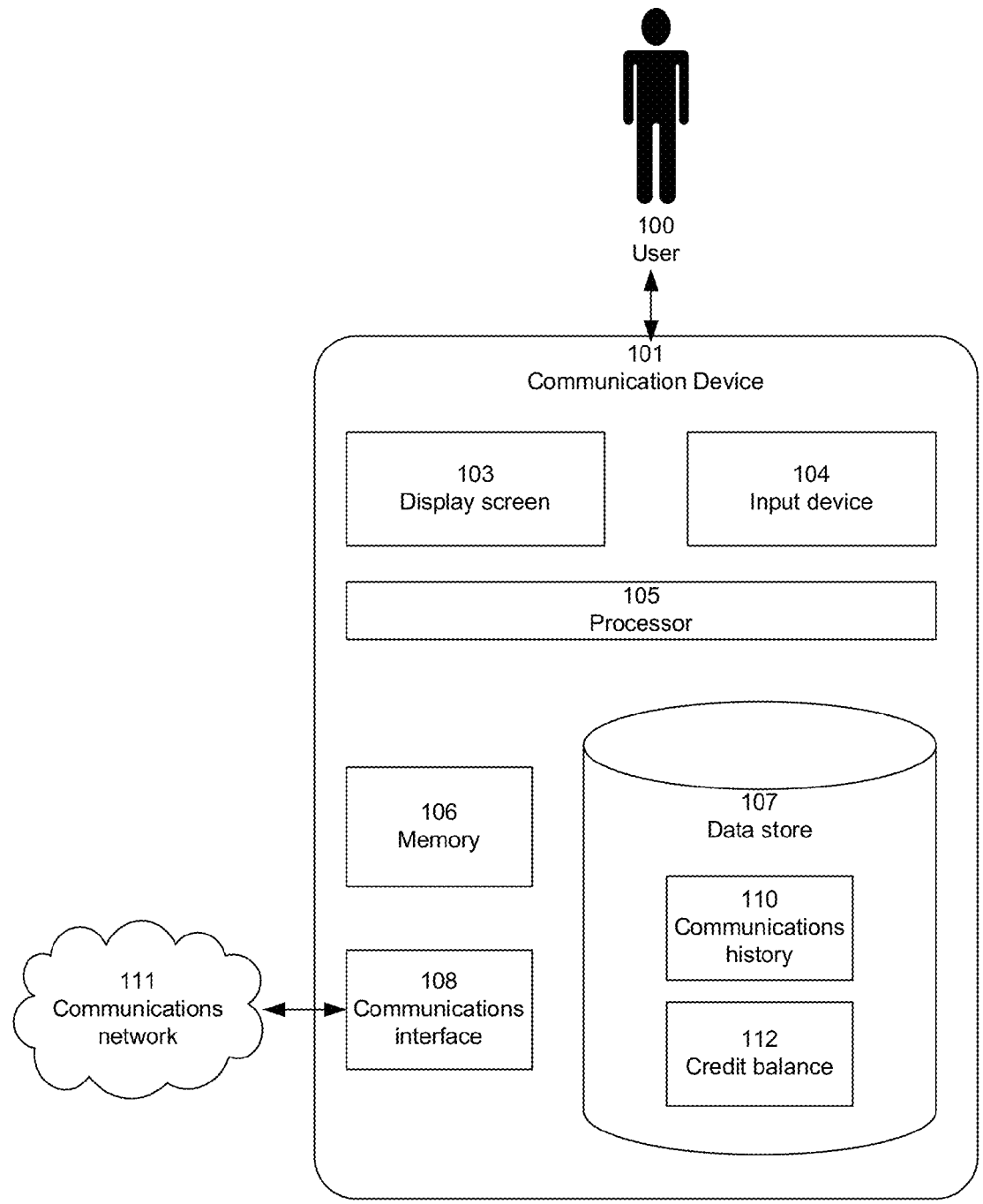
FIG. 1 is a block diagram depicting a communication device for implementing the present invention according to at least one embodiment of the present invention.

For ease of nomenclature, the initiator of an electronic communication is referred to herein as a "sender", although such a term may apply to a caller, initiator, or any other individual who initiates an electronic communication. The receiver is referred to as a "recipient", although this may apply to a callee or any other individual who receives an electronic communication. The techniques of the present invention can be applied to any form of electronic communication, whether wireless or wired, including but not limited to telephone calls, wireless calls, text messages, instant messages, email messages, tweets, proprietary messages, voicemail messages, chat messages, and the like. Such communications may be synchronous or asynchronous, and may be sent and received using any type of communication device, including but not limited to telephones, wireless telephones, smartphones, personal computers, laptops, personal digital assistants, tablet computers, or the like. Such communications can take place over any form of electronic network, whether wired or wireless, including but not limited to the Internet, wireless telephone networks, wired telephone networks, pager networks, WiFi, and the like.

System Architecture

Generally, as described in more detail herein, the system and method of the present invention provide mechanisms for enforcing a degree of symmetry in sending and receiving of electronic communications such as those sent via a mobile communications device, so as to place limits on the number of free and/or discounted communications available to a user. According to various embodiments, the present invention can be implemented in connection with any suitable device or combination of devices configured to initiate and/or receive electronic communications, including for example and without limitation, smartphones, cell phones, personal digital assistants, landline telephones, pay-phones, VoIP phones, computers, tablet computers, laptop computers, desktop computers, handheld computers, kiosks, game systems, televisions, pagers, videophones, chat applications, instant messaging applications, and the like.

The techniques of the present invention can be implemented in connection with any suitable types of electronic communications, such as for example, and without limitation, short message service (SMS, or "text") messages, multi-media message service (MMS) messages, voice calls, voicemail messages, email messages, instant messages, chat, video chat, posts to social networking websites and/or blogs, and the like. Communications may be implemented via any suitable communications network and according to any known communications protocol. Examples include the Internet, cellular telephone networks, EDGE, 3G, 4G, long term evolution (LTE), Session Initiation Protocol (SIP), Short Message Peer-to-Peer protocol (SMPP), SS7, WiFi, Bluetooth, Hypertext Transfer Protocol (HTTP), Secure Hypertext Transfer Protocol (SHTTP), Transmission Control Protocol/Internet Protocol (TCP/IP), and/or the like, and/or any combination thereof. Communications may be secured, if appropriate, using any known security techniques such as, for example, a Virtual Private Network (VPN).

For illustrative purposes, the invention is described herein in connection with text messages sent from one mobile device to another; however, one skilled in the art will recognize that the techniques of the present invention is not limited to such devices and communication channels. Rather, the techniques of the present invention can be implemented in other contexts, such as voice calls made over mobile telecommunications devices, or any type of electronic communications made over any suitable device or service. In addition, the particular appearance and layout of the various user interface screens for implementing the techniques of the present invention can vary from those presented in the examples herein. Accordingly, the following description is intended to illustrate various embodiments of the invention by way of example, rather than to limit the scope of the claimed invention.

In at least one embodiment, the present invention is implemented as software running on a communication device. Such software can be in the form of an application (or "app") that can be downloaded (or otherwise obtained) and installed on the device. Alternatively, the functionality of the present invention can be included in software that is bundled with the device, such as operating system software, or delivered as a service to a device running a browser. In other embodiments, as described in more detail below, the system of the present invention can be implemented without any specialized software running on the communication device. For example, the system of the present invention can be implemented in such a manner that a third party, app network, telephone company, or other entity enforces limits on free and/or discounted communications to and/or from a user, without any such operations being performed on the communication device itself.

Referring now to FIG. 1, there is shown a block diagram depicting a communication device 101 for implementing the present invention according to at least one embodiment of the present invention. Device 101 may be any electronic device configured to initiate and/or receive electronic communications; for example, smartphone, cell phone, desktop computer, laptop computer, personal digital assistant (PDA), music player, handheld computer, tablet computer, kiosk, game system, television, or the like. In at least one embodiment, device 101 is an iPhone available from Apple Inc. of Cupertino, Calif., running an operating system such as iOS, also available from Apple Inc. of Cupertino, Calif.

In at least one embodiment, communication device 101 comprises a number of hardware components as are well known to those skilled in the art. Input device 104 can be a keyboard, mouse, touchscreen, trackball, trackpad, five-way switch, voice input device, joystick, and/or any combination thereof. In embodiments wherein input device 104 is a touchscreen, a virtual keyboard and/or other input elements can be displayed thereon, according to known techniques. Display screen 103 is also provided, for displaying a user interface wherein text messages can be composed and read, and wherein user 100 can read and/or interact with messages received from others, and/or control the operation of device 101. Device 101 can also include other input and/or output device(s) (not shown), such as a microphone, speaker(s), camera(s), button(s), servomotor (for enabling vibrate alerts), and the like. Device 101 can be controlled in various ways, including voice control, according to well-known means.

Processor 105 can be a conventional microprocessor for performing operations on data under the direction of software, according to well-known techniques. Memory 106 can be random-access memory having a structure and architecture as are known in the art, for use by processor 105 in the course of running software. Communications interface 108 may include any software and/or hardware for enabling communications via communications network 111. Such interface 108 may include a radio, for example, for enabling transmission and reception of data across a cellular telephone network or other wireless network.

Data store 107 can be any magnetic, optical, and/or electrical storage device for storage of data in digital form; examples include flash memory, magnetic hard drive, CD-ROM, and/or the like. In at least one embodiment, data store 107 stores information describing communications history 110 that may be used, in some embodiments, for enforcing limits on free and/or discounted communications. In at least one embodiment, data store 107 includes data representation of a credit balance 112 for keeping track of the number of credits available to device 101 (and/or to user 100) for outgoing free and/or discounted communications, according to the techniques described herein. In at least one embodiment, communications history 110 and/or credit balance 112 is stored in a database, or in some other suitable storage mechanism, in data store 107. Alternatively or in addition to being stored in data store 107, such data can be stored in a central location such as on a server. Data store 107 may also contain any other information relevant to the operation of device 101, according to known techniques.

Credit balance 112 represents a current quantity of credits available to user 100 for initiating outgoing communications. In at least one embodiment, credits are non-monetary in nature, and have no value outside of the system for enforcing limits on free and/or discounted calls. In other embodiments, credits are representative of a monetary value. In yet other embodiments, credits are non-monetary but can be converted to and/or from monetary instruments.

In at least one embodiment, different types of credits can be available for different communication types: for example, one type of credits may be available for text-messaging (or SMS), and a different type of credits may be available for voice communications. Each credit type can have its own balance, and each balance can be handled separately for purposes of the techniques of the present invention. In at least one embodiment, credits can be exchanged for other types of credits according to some predetermined rate. For example, if a user does not have sufficient text messaging credits, he or she can use voice call credits at some predetermined rate of exchange. In addition, in at least one embodiment, a user can expend credits of any type or combination of types, to initiate a communication, whether or not some or all of the expended credits correspond to the same type as the initiated communication; predetermined exchange rates determine how many of each type of credit need be expended. As another example, in at least one embodiment, users can freely exchange credits of one type for credits of another type, based on some predetermined rate of exchange. In at least one other embodiment, credits cannot be exchanged for other types of credits.

One skilled in the art will recognize that the particular arrangement of hardware elements shown in FIG. 1 is merely exemplary, and that the invention can be implemented using different hardware elements configured in any of a number of different ways. Thus, the particular architecture shown in FIG. 1 is merely illustrative and is not intended to limit the scope of the invention in any way. In alternative embodiments, the system of the present invention can be implemented in other ways.

Figure 2:
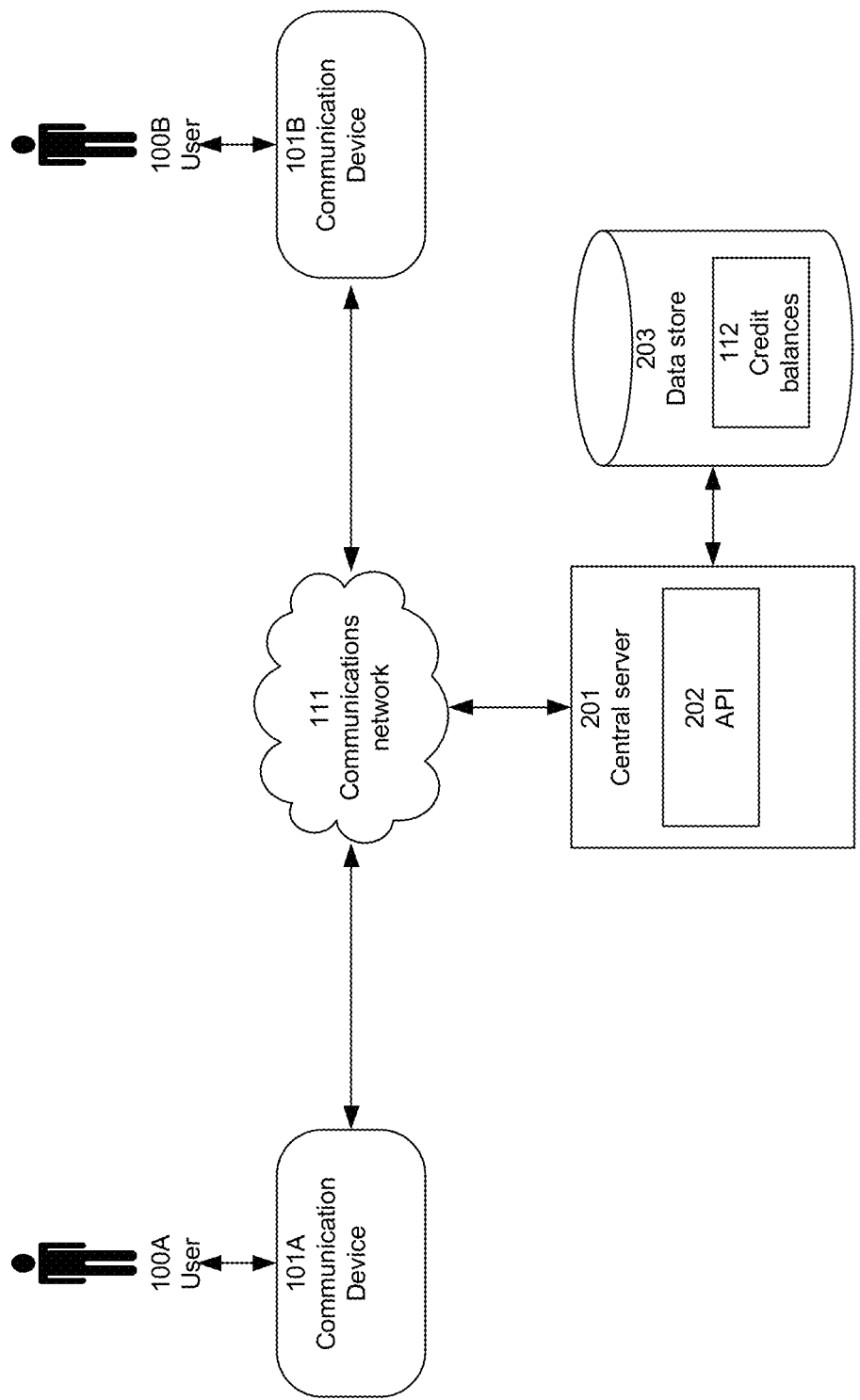
FIG. 2 is a block diagram depicting a system architecture for implementing the present invention according to at least one embodiment of the present invention.

Referring now to FIG. 2, there is shown a system architecture for implementing the present invention according to at least one embodiment of the present invention. One skilled in the art will recognize that the depicted architecture is merely exemplary, and that the system of the present invention can be implemented using other architectures.

As depicted in FIG. 2, the system of the present invention operates in connection with communications among users 100, such as user 100A and user 100B, via communication devices 101A, 101B. Generally, as described in more detail herein, the system and method of the present invention provide a mechanism for enforcing limits on free and/or discounted electronic communications initiated by a user 100A and/or 100B.

As described above, communication devices 101A, 101B may be of any suitable type. Devices 101A, 101E communicate with one another via communications network 111, which may include, for example, the Internet, cellular telephone networks, EDGE, 3G, 4G, long term evolution (LTE), Session Initiation Protocol (SIP), Short Message Peer-to-Peer protocol (SMPP), SS7, WiFi, Bluetooth, Hypertext Transfer Protocol (HTTP), Secure Hypertext Transfer Protocol (SHTTP), Transmission Control Protocol/Internet Protocol (TCP/IP), and/or the like, and/or any combination thereof. As described in more detail below, central server 201 is also communicatively connected with devices 101A, 101B, via network 111 or via another communications network. Network 111 may be wireless or wired, or any combination thereof. For illustrative purposes, central server 201 is depicted and described herein as a single machine; however it may instead be implemented as a cluster of machines, located in a single location or in multiple locations In at least one embodiment, an application programming interface (API) 202 runs at central server 201, and performs various steps involved in the operation of the present invention. In at least one embodiment, API 202 is implemented as software for controlling the operation of one or more processors running at central server 201. For example, API 202 may cause central server 201 to interact with software running at devices 101A, 101B so as to enforce limits on free and/or discounted electronic communications according to the techniques described herein. In connection with such operations, central server 201 may retrieve, access, and/or adjust credit balances 112 for users 100 and/or for devices 101, according to the techniques described herein. Such credit balances 112 can be stored at data store 203 associated with central server 201, and/or at any other suitable location. As described above, credit balances 112 can be stored at individual devices 101 in addition to or instead of being stored at data store 203.

Additional devices can also be connected to network 111 and may operate in conjunction with the present invention. For example, the techniques of the present invention can be implemented in connection with any number of users 100 and/or devices 101.

Method

According to various embodiments of the present invention, mechanisms are provided for enforcing a degree of symmetry in sending and receiving of communications, including for example voice calls and text messages sent via a mobile communications device, so as to place limits on the number of free and/or discounted communications available to a particular user 100 and/or on a particular device 101. A credit balance 112 is maintained, to keep track of how many free and/or discounted outgoing communications are available at any given time; once credit balance 112 is depleted, user 100 and/or device 101 are blocked from initiating free and/or discounted outgoing communications until additional credits are acquired. In various embodiments, credits are acquired by receiving qualifying incoming communications paid for by another party. In various embodiments, credits can also be purchased. The limits placed on free and/or discounted communications can be imposed on a per-user and/or per-device basis.

Figure 3:
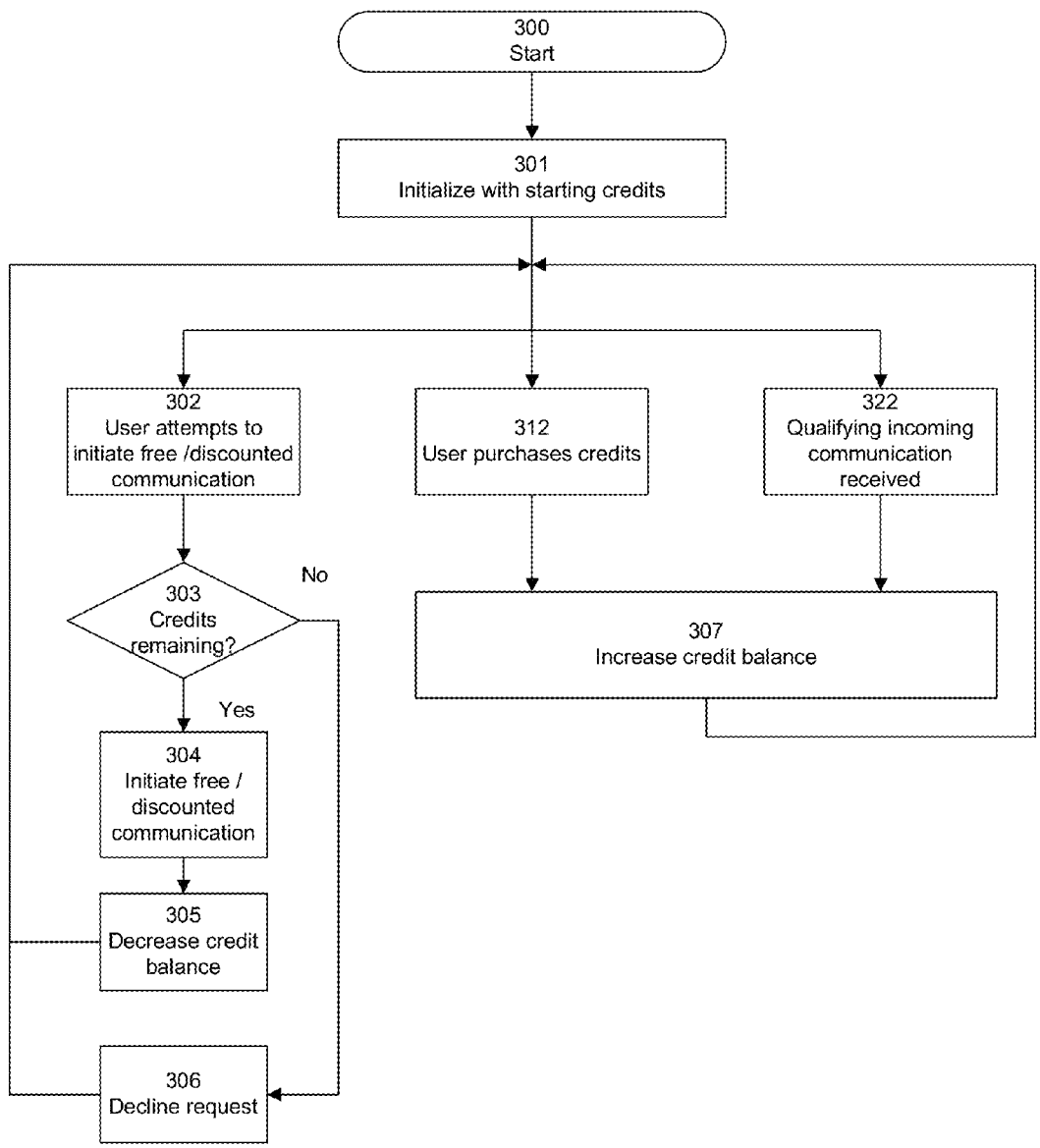
FIG. 3 is a flow diagram depicting a method for enforcing limits on free and/or discounted electronic communications, according to at least one embodiment of the present invention.

Referring now to FIG. 3, there is shown a flowchart depicting a method for enforcing limits on free and/or discounted electronic communications, according to at least one embodiment of the present invention. The method depicted in FIG. 3 can be practiced, for example, by software running at device 101 associated with user 100; for example, such software may provide functionality for enabling sending and receiving of free, discounted, and/or paid text messages and/or other types of communications. Alternatively, the method can be practiced at software running at a carrier, server, or other device or service for enabling electronic communications among users 100. Alternatively, the method can be practiced at a combination of device-based and centrally-based software. One skilled in the art will recognize that the particular sequence of steps shown in FIG. 3 is merely illustrative, and that the present invention can be practiced using other sequences of steps.

A user 100 or device 101 is given 301 an allotment of credits, each worth some quantity of free and/or discounted communications; for example, each credit may be worth one or more text messages or one or more minutes of voice calls. For example, a device 101 can be given an initial allotment of ten credits, each worth one text message. A counter reflects a credit balance 112, stored at device 101 and/or at a central data store 203, and indicates how many credits remain for use by user 100 and/or device 101.

As discussed above, in at least one embodiment, credits are non-monetary in nature. In embodiments where credits represent monetary value, credit balance 112 can be reflective of an actual monetary account.

This credit balance 112 is continually adjusted based on how many communications of a particular type have been initiated at device 101, and how have been received at device 101. Credit balance 112 may or may not be visible on display screen 103. In at least one embodiment, credit balance 112 may be presented as a numeric value and/or graphic indicator. In at least one embodiment, a distinctive visual, auditory, or haptic indicator may be provided to warn user 100 when credit balance 112 falls below some threshold amount, or is at zero. In at least one embodiment, an additional indicator is shown when credit balance 112 is increased or decreased, so as to inform user 100 of the change in credit balance 112.

In at least one embodiment, if device 101 is used by more than one user 100, credit balance 112 can be shared among such users 100, or each such user 100 may have his or her own account with a separate credit balance 112. Users 100 may sign on to make communications using unique login identifiers and/or passwords, so that they consume and receive credits on an individual basis. In such an embodiment, therefore, two different users 100 on a particular device 101 may have different credit balances 112, so that the number of available credits may depend on which user 100 is signed into his or her account on device 101 at any given point in time. In another embodiment, credits are associated with device 101 rather than with individual users 100, so that a certain number of credits may be available at a given point in time on device 101, regardless of which user 100 is using device 101.

In at least one embodiment, whenever a qualifying incoming communication is received 322 by user 100 at device 101, credit balance 112 for that device 101 or user 100 is increased 307 accordingly, on the assumption that the carrier will be able to recoup the receiving costs from the sending carrier. In at least one embodiment, credit balance 112 is increased whether or not user 100 actually reads (or listens to, acknowledges, or participates in) the communication; in another embodiment, credit balance 112 is only increased when user 100 actually reads (or listens to, acknowledges, or participates in) the communication. In at least one embodiment, as described below, certain incoming communications may qualify and others may not; for example, those incoming communications that are paid for by the sender qualify for accrual of credits, while those that are not paid for do not accrue credits. In addition, in at least one embodiment, different qualifying incoming communications may earn different numbers of credits, depending on various factors as described below.

Free and/or discounted communications initiated at device 101 cause credit balance 112 to be decreased. Whenever user 100 attempts 302 to initiate a free and/or discounted communication (for example by sending a free text message), a determination is made 303 as to whether sufficient credits remain on device 101 (or on user's 100 account); if so, the requested free and/or discounted communication is initiated or sent 304 and the credit balance is decreased 305 accordingly.

Once the credit balance has been depleted or falls below a defined threshold amount, the ability to initiate free and/or discounted communications at device 101 may be temporarily blocked, until the credit balance is increased by receiving communications or by some other means. In an embodiment where credits are associated with individual users 100 rather than devices 101, an individual user's 100 ability to initiate free and/or discounted communications can be temporarily blocked, while another user 100 who still has credits may still be able to initiate free and/or discounted communications using the same device 101 (once that user 100 has appropriately logged in to access his or her credits).

Figure 8:
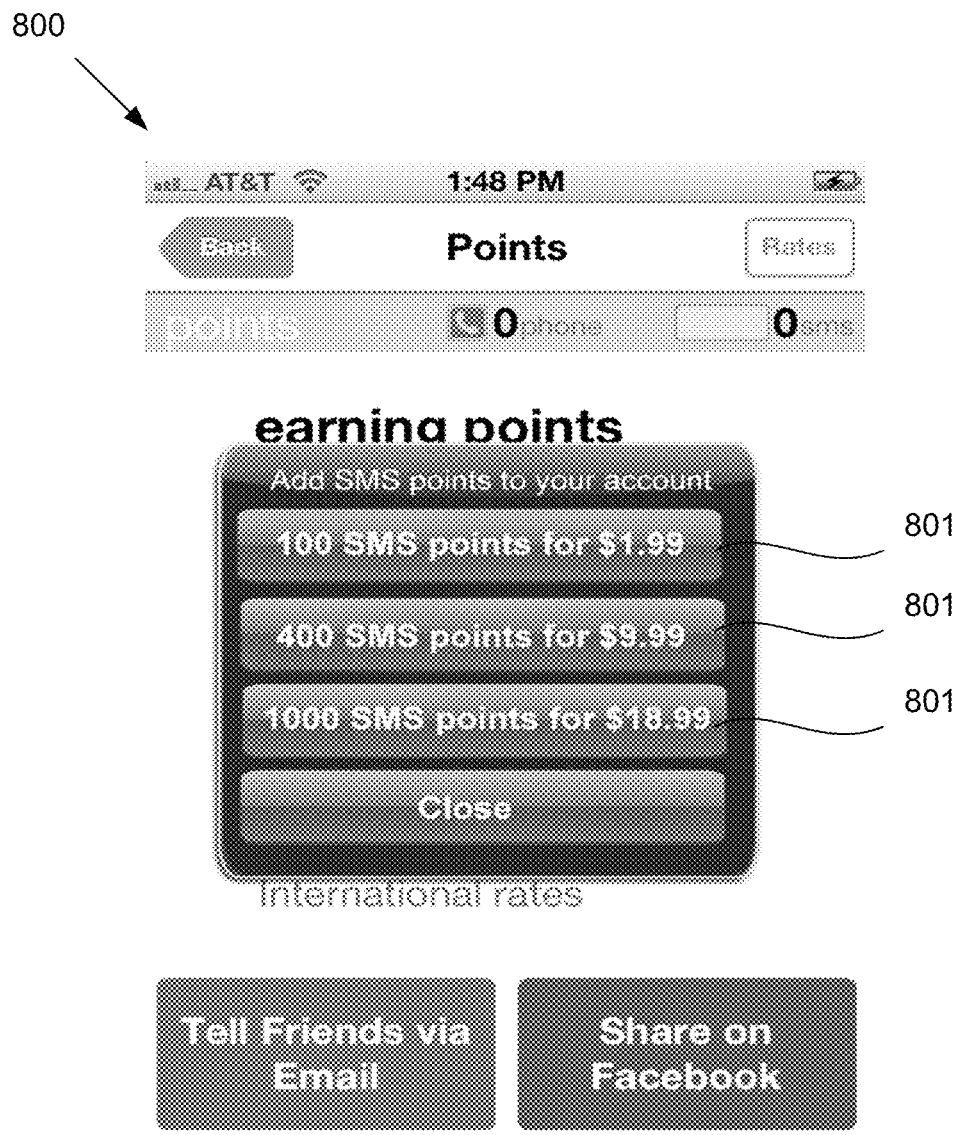
FIG. 8 is a screen shot depicting an example of a screen for purchasing credits according to at least one embodiment of the present invention.

In at least one embodiment, if no or insufficient credits remain, the request to send a message is declined 306. In at least one embodiment, when a request is declined 306, user 100 may be given an opportunity to purchase credits, and/or may be given an opportunity to send the message by paid channels. Referring now to FIG. 8, there is shown an example of a screen 800 for purchasing credits. Buttons 801 provide options for purchasing different amounts of credits.

In another embodiment, if no or insufficient credits remain, the message is sent by normal paid channels.

In at least one embodiment, user 100 can purchase 312 credits by entering a credit card number or by authenticating him- or herself to access a previously entered payment mechanism. In response to such an action, the credit balance is increased 307 accordingly.

In various embodiments, the technique of the present invention can be applied to any suitable type of communication. For example, for voice communications or other communications where the duration or length of the communication is relevant, each credit can correspond to a particular number of minutes rather than to a discrete communication. Thus, the credit balance corresponds to a total number of available minutes of free and/or discounted calls. Credits are deducted in response to outgoing minutes of free and/or discounted calls, and the credit balance is increased in response to incoming minutes of qualifying calls. In at least one embodiment, if credit balance 112 reaches zero in the midst of an outgoing communication (for example a voice call), the communication can be terminated automatically. In at least one embodiment, user 100 can be given a warning and/or grace period before such termination takes place, and/or can be given an opportunity to replenish credit balance 112 to avert termination of the call.

In at least one embodiment, credit balance 112 may drop below zero, for example if user 100 uses the grace period or otherwise fails to terminate a telephone call (or other communication) that continues to use credits after the credit balance has reached zero. In at least one other embodiment, credit balance 112 may not drop below zero, because the system blocks and/or terminates any further free outgoing communications when credit balance 112 has reached zero. In at least one embodiment, credit balance 112 does not drop below zero even when the grace period is used.

In at least one embodiment, each qualifying incoming communication earns a fixed number of credits, such as one credit, regardless of the size or nature of the communication. In another embodiment, each qualifying incoming communication earns a number of credits that can vary depending on any suitable factor or factors; for example, the number of credits earned by receiving a qualifying incoming communication can depend on the size of the communication (expressed, for example as a number of kilobytes or megabytes), the type of communication, the sender, the amount paid by the sender, the source, the carrier, the duration or length of the communication, the bandwidth consumed by the communication, and/or any other suitable factor or factors. For example, a text message may be worth one credit, while a message containing a photo attachment may be worth three credits, and a voice call may be worth 2 credits per minute.

In at least one embodiment, the number of credits deducted for each free and/or discounted outgoing communication initiated by user 100 and/or at device 101 is fixed; for example, each such communication can "cost" one credit, regardless of the size or nature of the communication. In another embodiment, a conversion rate can be established to determine a cost (in credits) for each free and/or discounted outgoing communication; this conversion rate can be fixed, or can vary depending on any suitable factor or factors; for example, the cost can depend on the size of the communication (expressed, for example as a number of kilobytes or megabytes), the type of communication, the amount of the discount (if applicable), the sender, the type of device, the intended recipient, the carrier, the duration or length of the communication, the bandwidth consumed by the communication, and/or any other suitable factor or factors. For example, a text message may cost one credit, while a message containing a photo attachment may cost three credits, and a voice call may cost 2 credits per minute.

The cost of outgoing communications may or may not be related to the amount earned for similar incoming communications.

For purposes of this description, the term "cost" is intended to mean the amount by which credit balance 112 is decreased when an outgoing communication takes place.

In at least one embodiment, a user interface can be provided to allow user 100 to trade one type of credit for another, for example exchanging voice minutes for text messages, or vice versa, at some appropriate exchange rate. In at least one embodiment, credit balance 112 can be expressed in terms of some currency or point system, with each type of communication having a corresponding cost in credits.

In at least one embodiment, incoming communications qualify for accrual of credits only if it can be determined that the incoming communication is being paid for by the initiator of the communication. In at least one embodiment, for example, calls from landlines might be excluded, so that only calls from mobile telephones increase the allotment. In at least one embodiment, only communications from certain carriers, jurisdictions, and/or regions may increase credit balance 112, while other communications do not. Various known techniques can be used for identifying the origin of an incoming communication, so as to determine whether or not the credit balance should be increased. In at least one embodiment, different types of incoming communications can accrue credits at different conversion rates. The conversion rate for accrual of credits based on incoming communications may be equal to the rate for converting credits to outgoing communications, or the two rates may be different from one another.

In at least one embodiment, an incoming communication qualifies for accrual of credits only if the recipient reads, listens to, participates in, responds to, and/or otherwise takes action with respect to the communication.

In at least one embodiment, certain communications can be initiated without affecting user's 100 credit balance 112. For example, in at least one embodiment, user 100 can initiate paid communications without affecting credit balance 112. In addition, certain communications to other subscribers of a particular service may be permitted for free, without affecting credit balance 112. For example, a free text message may be permitted to a recipient, without affecting the sender's credit balance 112, if it is known that the recipient subscribes to an ad-supported text message service, so that the cost of receiving the text message will be borne by the ad-supported service.

In at least one embodiment, restrictions may be placed on the types of communications that can be initiated for free, or can be discounted, using credits. For example, such free and/or discounted communications can be limited to calls and/or messages within the country or state, or to recipients that are on a particular carrier. Similarly, in at least one embodiment, restrictions can be placed on the type of incoming communications that increase the credit balance; for example, calls from outside the country or state, or from certain carriers, might be ineligible to increase credit balance 112.

In at least one embodiment, user 100 can receive additional credits in various ways. For example, user 100 can be granted a fixed additional allotment of credits periodically (such as on a monthly basis).

In at least one embodiment, credit balance 112 can be increased in other ways in response to certain trigger events or actions. For example, the user can participate in certain activities and/or perform certain actions to increase credit balance 112. Examples of actions that may earn credits include: agreeing to accept promotional messages; viewing ads; referring other customers; participating in surveys; making qualifying purchases from certain merchants; and the like.

In at least one embodiment, mechanisms can be implemented that allow transfers of credits from one user 100 to another, or gifts consisting of some number of credits. In at least one embodiment, user 100 can use credits to purchase other tangible or nontangible goods or services, and/or exchange them for money, airline miles, or other currency-like resources.

In at least one embodiment, a maximum credit balance can be imposed, so that user 100 cannot "save up" additional credits beyond the specified maximum balance. In at least one embodiment, credits expire after some period of time.

In at least one embodiment, the above-described techniques can be used to enforce limits on discounted communications. For example, credits can be accrued substantially as described above; such credits can then be used for obtaining discounts on outgoing communications. Any suitable rate can be established for converting credits to discounts.

In at least one embodiment, subject to local laws and regulations, monetary instruments or accounts can be used in lieu of a non-monetary credit balance 112. Thus, qualifying incoming communications can earn monetary credit to be deposited in a monetary account associated with user 100, such as a bank account, debit card account, credit card account, or the like. Outgoing communications can cause such an account to be debited according to the cost of the communication.

User Interface

In at least one embodiment, display screen 103 of device 101 can indicate the current credit balance 112 for a device 101 and/or user 100, and (if appropriate) can show how the credits translate into minutes and/or text messages, so as to inform user 100 as to how many free and/or discounted minutes and/or messages are currently available to user 100. This display can take any form as appropriate, including graphical, text, and/or numeric components, to inform the user as to his or her current credit balance. The display can be dynamic, so that it changes with each incoming or outgoing free and/or discounted communication. If appropriate, the display can change during a communication, for example as each minute passes on a voice call.

In other embodiments, user 100 can be informed of his or her credit balance 112 in other ways, including for example and without limitation: consulting a web page, receiving a text message or email message, voice call (either automated or not), printed statement, audio signal, indicator light, dedicated display, haptic signal (such as a vibration) or the like. In yet another embodiment, user 100 may not be given access to such information.

In at least one embodiment, a distinctive alert or indicator may be provided to warn user 100 when credit balance 112 falls below some threshold amount, which can be fixed or user-configurable, or when credit balance 112 reaches zero. Any suitable alert or indicator can be used, including for example visual, auditory, and/or haptic alerts.

For example, a pop-up alert can be shown when user 100 has two or fewer credits left. The alert can include a reminder to user 100 to encourage his or her friends to send him or her more text messages so as to increase the credit balance; for example, "You have only 2 outbound texts left! Receive more texts (tell your friends to text you) or buy more credits." A further alert can be shown when user 100 has no remaining credits; for example, "Oops, looks like you're out of outbound texts. Receive more texts (tell your friends to text you) or buy more credits." Either or both of these alerts can be accompanied by buttons or links for sending a reminder to friends to send more text messages to user 100, and/or to a purchase screen for buying more credits. In another embodiment, the system of the present invention provides mechanisms for sending such reminders to friends without using credits, for example by sending messages using other communications channels. Such communications channels can include, for example and without limitation, email, Facebook, and the like.

In another embodiment, credit balance information, including warnings and alerts, can be presented and/or sent to user 100 by any suitable means, including and without limitation, a web page, email, text message, Facebook, and the like.

As described above, when user 100 has insufficient or no remaining credits, user 100 may be prevented from initiating any free and/or discounted communications, until the credit balance is increased.

As another example, the allotment display can flash, or be presented in a different color or font, or can otherwise be highlighted, when credit balance 112 drops below the threshold level.

Figure 4A:
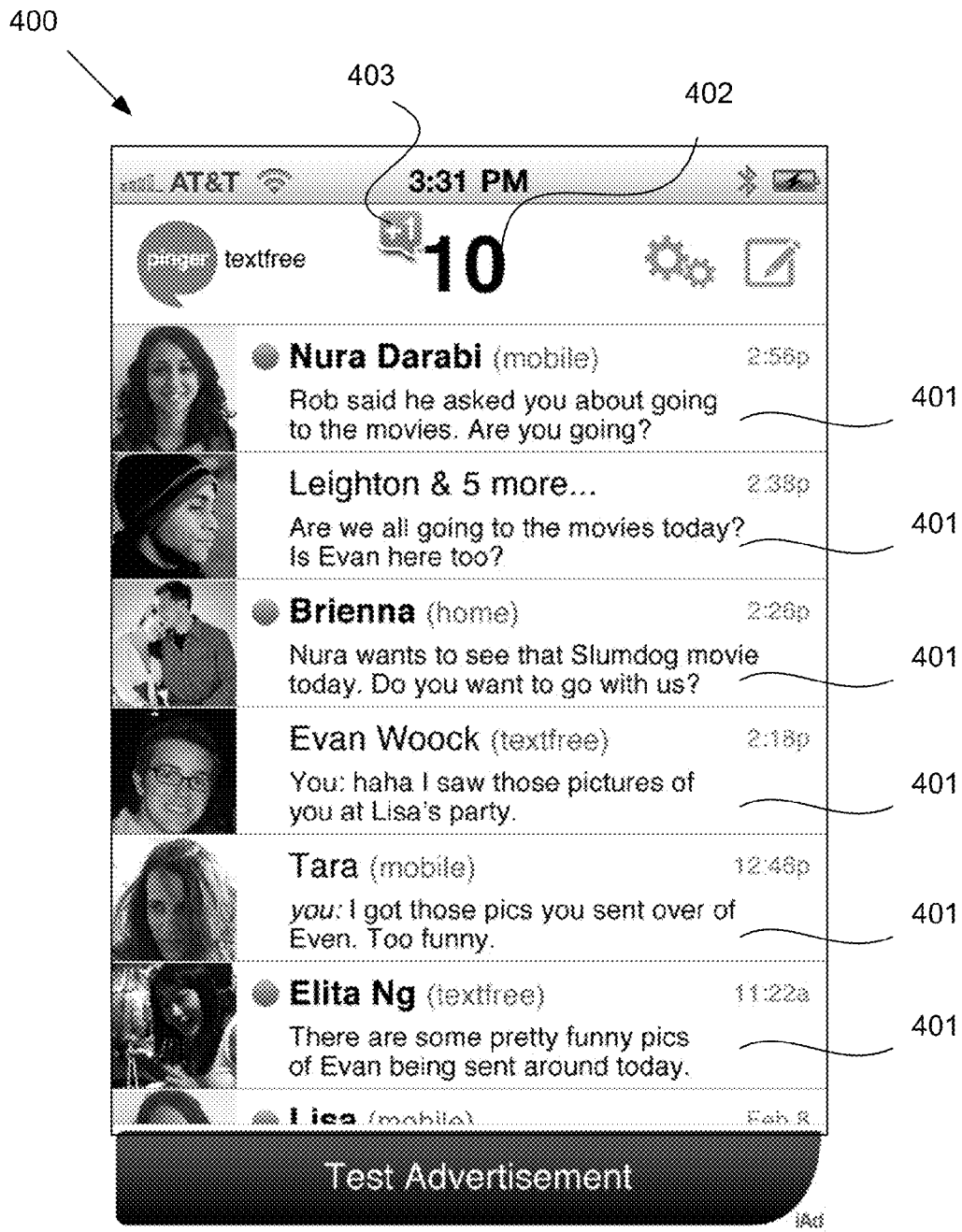
FIG. 4A is a screen shot depicting an example of a user interface for viewing and interacting with text messages according to at least one embodiment of the present invention.

Referring now to FIG. 4A, there is shown a screen shot 400 depicting an example of a user interface for viewing and interacting with text messages 401 according to at least one embodiment of the present invention. In this example, the system of the present invention is implemented on a device having a touch-sensitive screen, such as an iPhone from Apple Inc. of Cupertino, Calif. Accordingly, screen shot 400 is an example of a user interface as it might appear on display screen 103 of device 101 used by user 100. One skilled in the art will recognize that the display shown in FIG. 4A is merely exemplary, and that the techniques of the present invention can be implemented using other arrangements and layouts.

At the top of screen shot 400 is a credit balance indicator 402 showing current credit balance 112 associated with device 101 and/or user 100; in the example, the balance shows "10", indicating that this particular device 101 and/or user 100 currently has an allotment of 10 free and/or discounted outgoing text messages. Recent change indicator 403 informs user 100 of any recent changes in credit balance 112; in this example, indicator 403 shows "+1", indicating that user 100 has just earned one credit for an incoming text message. In at least one embodiment, when a credit is earned, such an indicator 403 is displayed in a transitory fashion, such as momentarily or until dismissed. Also, indicator 402 is updated to reflect the credit balance 112 increase. In at least one embodiment, when a credit is used (for example when user 100 sends a free and/or discounted text message), indicator 403 (such as a "−1" indicator 403) is displayed in a transitory fashion, such as momentarily or until dismissed. Also, indicator 402 is updated to reflect the credit balance 112 increase. In another embodiment, recent change indicator 403 can be omitted, or can be shown only when a credit is earned or only when a credit is used. In another embodiment, user 100 can specify, via a preferences screen, whether and when indicator 403 should be shown.

In at least one embodiment, certain types of communications may be free and/or discounted and may not cause any credits to be used. In at least one embodiment, when a user initiates such a communication, an indicator (not shown) can be displayed in a transitory fashion to inform user 100 that this communication is free and/or discounted and did not use any credits. Such an indicator can take any suitable form. For example, credit balance indicator 402 may flash or be momentarily highlighted to emphasize the fact that its value did not change. Alternatively, recent change indicator 403 can show "0" or some other message informing user 100 that no change has been made to credit balance 112.

In at least one embodiment, a user can invoke a screen for viewing more details concerning the current credit balance 112. For example, such a screen can be invoked when the user taps on the credit balance indicator 402 or on a button or other user interface element.

Figure 4B:
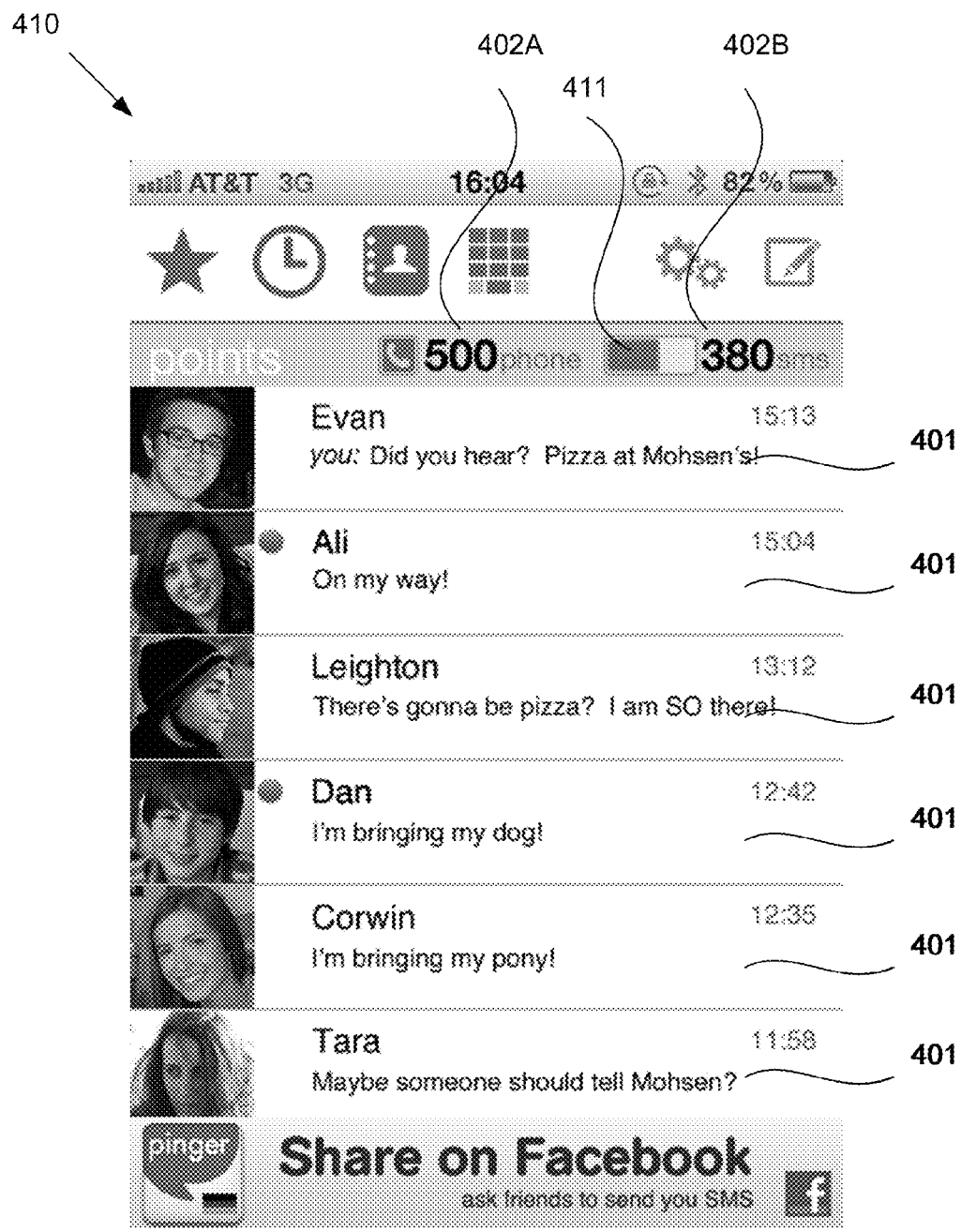
FIG. 4B is a screen shot depicting an example of a user interface for viewing and interacting with text messages according to another embodiment of the present invention.

Referring now to FIG. 4B, there is shown a screen shot 410 depicting an example of a user interface for viewing and interacting with text messages 401 according to another embodiment of the present invention, wherein at least two different types of credits can be accumulated and used. Again, screen shot 410 is an example of a user interface as it might appear on display screen 103 of device 101 used by user 100. One skilled in the art will recognize that the display shown in FIG. 4B is merely exemplary, and that the techniques of the present invention can be implemented using other arrangements and layouts.

In the example of FIG. 4B, voice credits and text message (or SMS) credits can be accumulated. Indicators 402A and 402B reflect the current balance of voice credits and text message credits, respectively, and are updated as incoming and/or outgoing communications take place. In at least one embodiment, a capacity indicator 411, which may be shown as an icon and/or numerically, indicates the current credit balance of a particular type as a percentage of a predetermined maximum allowable credit balance, and/or indicates the maximum number of credits (of a given type) that can be stored.

Figure 7:
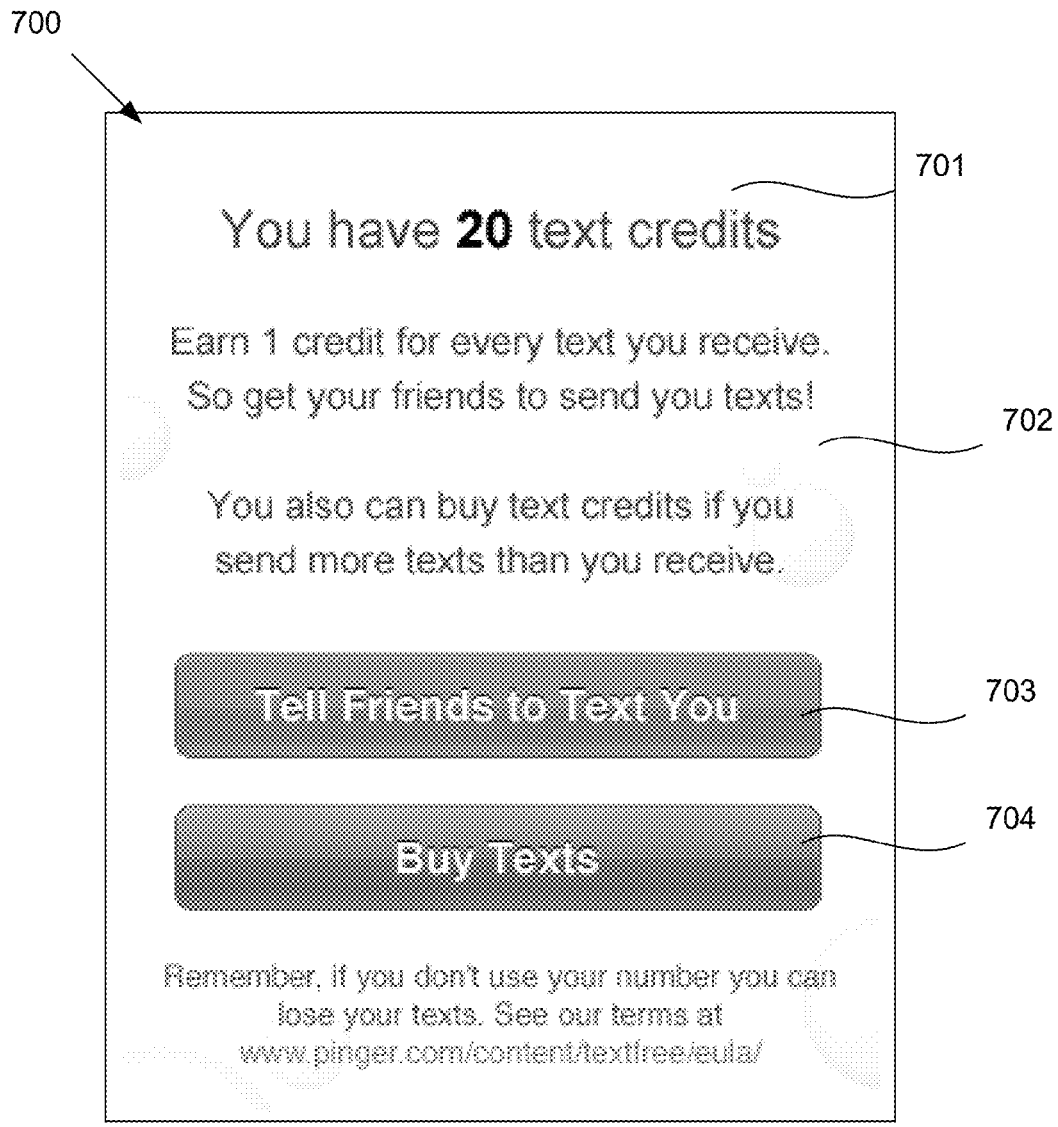
FIG. 7 is a screen shot depicting an example of a text credit balance screen according to at least one embodiment of the present invention.

An example of a text credit balance screen 700 is depicted in FIG. 7. Screen 700 includes an indicator 701 of current credit balance 112, along with a reminder 702 to inform user 100 that he or she can earn additional credits for received text messages. In at least one embodiment, screen 700 also includes button 703 that allows the user to send a message to remind his or her friends to text him or her, so that he or she can earn additional credits; in at least one embodiment, the sending of such a reminder message is free and does not use credits.

In at least one embodiment, screen 700 also includes button 704 to allow user 100 to buy additional credits. In at least one embodiment, credits can be purchased in fixed allotments for different prices; for example 10 credits for $X, 20 credits for $Y, and 30 credits for $Z, as appropriate. Charges can be made via credit card or any other suitable payment system. In at least one embodiment, activating button 704 takes the user to screen 800 for purchasing credits.

Although FIG. 7 depicts an example wherein credit balance screen 700 refers to text credits, a corresponding screen can be provided for other types of credits, including credits for voice calls and/or other types of communication. For example, in an embodiment where credits represent minutes of voice calls, indicator 701 may refer to "minutes" rather than "credits" or "texts". Similar adaptations and/or modifications can be made to any of other examples depicted and described herein, in connection with credit balances 112 for communications other than text messages. Thus, the particular screen displays depicted herein are intended to be exemplary, and can be adapted as needed for other types of communications.

Figure 5A:
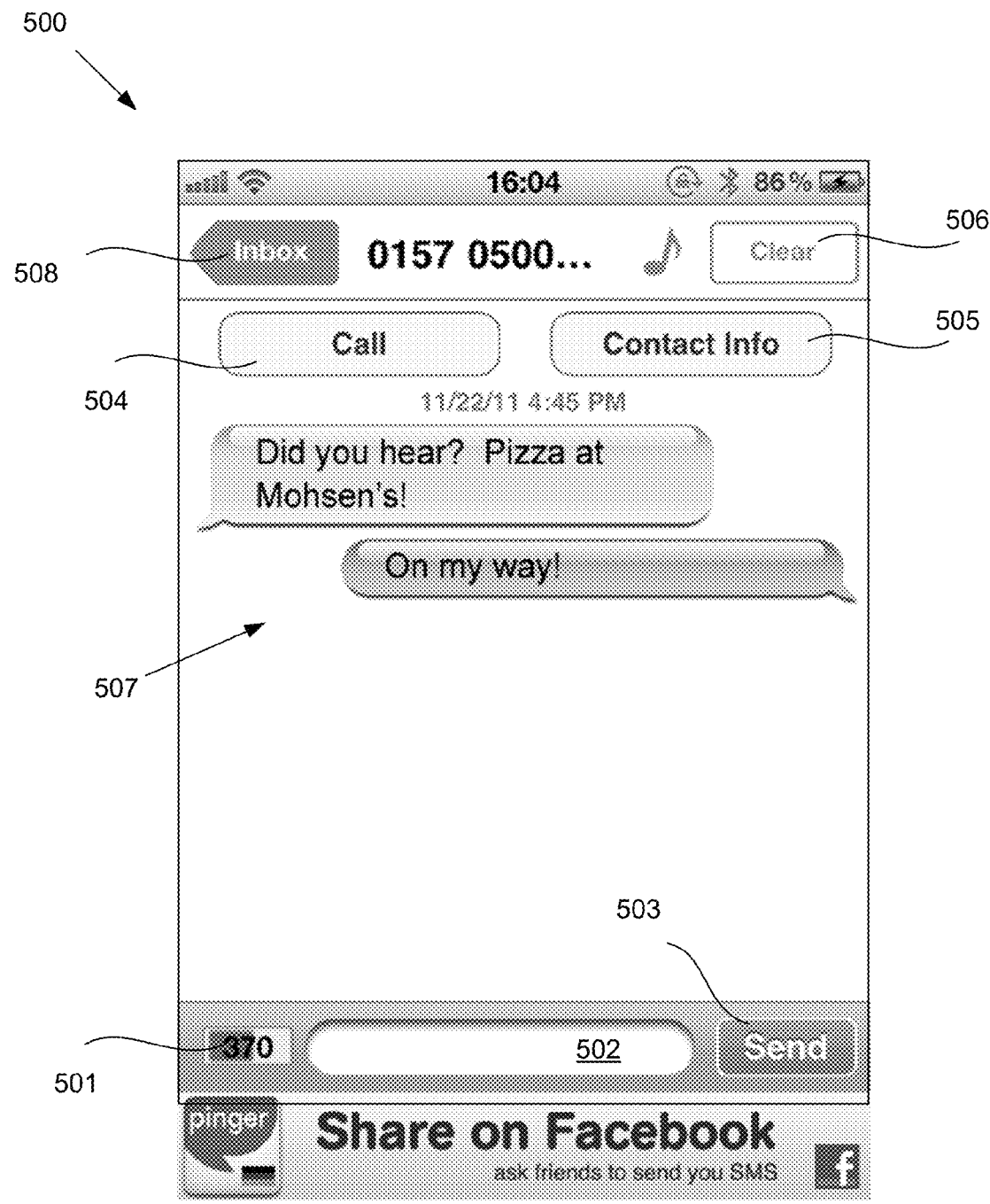
FIG. 5A is a screen shot depicting an example of a text message composition screen according to at least one embodiment of the present invention.

Referring now to FIG. 5A, there is shown an example of a text message composition screen 500 according to at least one embodiment, including conversation display 507 showing recent inbound and outbound text messages, text entry box 502 for composing new text messages, and send button 503 for causing an entered text message to be sent. Indicator 501 of credit balance 112 is shown adjacent to text entry box 502. In this example, indicator 501 includes both a numeric indication of the number of text messages remaining in credit balance 112, and a graphical indication of the credit balance as a percentage of the overall maximum credit balance. One skilled in the art will recognize that indicator 501 can take other forms, including for example a numeric indication of the number of text messages remaining in credit balance 112. Other buttons, such as call button 504, contact info button 505, inbox button 508, and clear button 506 are shown for illustrative purposes only.

Figure 6:
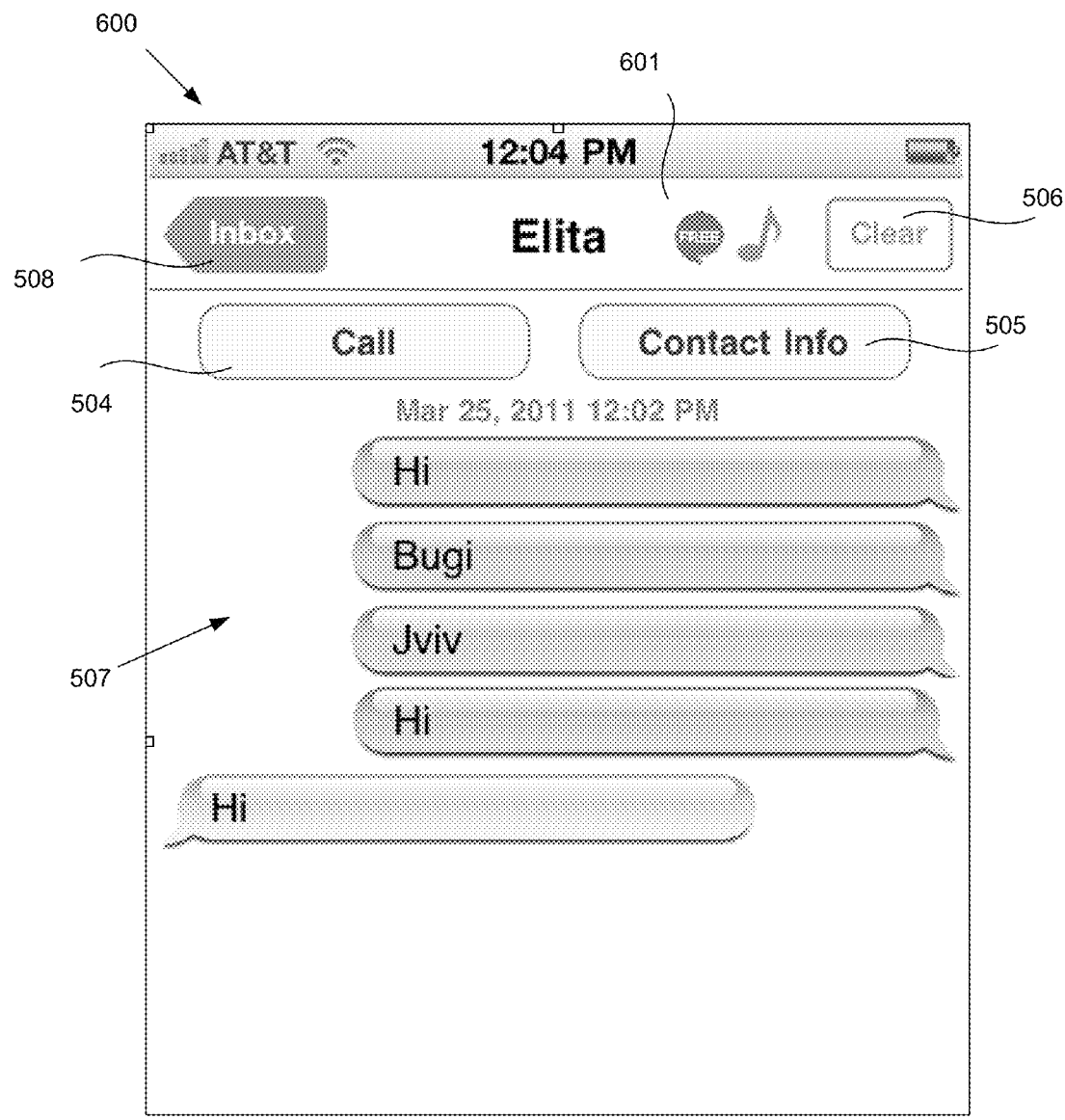
FIG. 6 is a screen shot depicting an example of a text conversation screen for a series of text messages to and from another user of the same application, according to at least one embodiment of the present invention.

Referring now to FIG. 6, there is shown an example of a text conversation screen 600 for a series of text messages to and from another user of the same application. In at least one embodiment, when both the sender and recipient of a text message are both users of (and subscribers of) a free texting service, text messages between the parties are free and are not deducted from the credit balance. Accordingly, in the example of FIG. 6, a "free" indicator 601 is shown in lieu of the credit balance indicator 402 or 501, to inform user 100 that text messages to and from this person are free and are not deducted from the credit balance.

Example

Tables #1 and #2 illustrate examples of the operation of the present invention according to at least one embodiment.

TABLE #1

| | Event Timestamp | Event | Credit Increase/ Decrease | Credit Balance | Comments |
|---|---|---|---|---|---|
| | | | | 5 | Assume 5 credits at start of example |
| 1 | 4/18/12 13:04:22 | Outgoing text message | −1 | 4 | |
| 2 | 4/18/12 13:04:48 | Outgoing text message | −1 | 3 | |
| 3 | 4/18/12 13:05:09 | Outgoing text message | −1 | 2 | |
| 4 | 4/18/12 13:05:55 | Incoming text message | +1 | 3 | |
| 5 | 4/18/12 13:08:02 | Outgoing text message | −1 | 2 | |

TABLE #1-continued

| Event | Timestamp | Event | Credit Increase/ Decrease | Credit Balance | Comments |
|---|---|---|---|---|---|
| 6 | 4/18/12 15:04:11 | Outgoing text message to subscriber of ad-supported service | 0 | 2 | No credits needed |
| 7 | 4/18/12 15:04:22 | Outgoing text message | −1 | 1 | |
| 8 | 4/18/12 20:26:22 | Outgoing text message | −1 | 0 | |
| 9 | 4/18/12 20:26:59 | Attempted outgoing text message | 0 | 0 | User attempt declined because no credits remain |
| 10 | 4/18/12 20:27:11 | User purchases credits | 10 | 10 | User pays for credits by credit card |
| 11 | 4/18/12 20:27:31 | Outgoing text message | −1 | 9 | |
| 12 | 4/20/12 08:43:35 | Incoming text message (deemed not to qualify for credit) | 0 | 9 | No credit awarded for non-qualifying incoming message |
| 13 | 4/23/12 15:04:11 | Outgoing text message to subscriber of ad-support text message service | 0 | 9 | No credits needed |
| 14 | 4/23/12 15:04:11 | Outgoing paid text message | 0 | 9 | No credits needed |

Several events in Table #1 illustrate features of various embodiments of the present invention, as described above.

For example, event #6 illustrates an example of an outgoing message that does not need or use a credit, since the message is being sent from one user of an app to another user of the same app.

In event #9, user 100 attempts to send a text message. Since credit balance 112 is zero, the attempt is declined. As described above in connection with FIG. 3, user 100 may be given an opportunity to purchase credits, and/or may be given an opportunity to send the message by paid channels.

As described above, some incoming messages may not qualify for accrual of credits. In this example, event #12 is such an event; therefore, no credits are added.

As described above, certain communications can be initiated without affecting user's 100 credit balance 112. In this example, event #13 is a text message sent to a subscriber of an ad-supported text message, and event #14 is a text message that is paid for by user 100; therefore, no credits are used for sending these two messages.

TABLE #2

| Event | Timestamp | Event | Credit Increase/ Decrease | Credit Balance | Comments |
|---|---|---|---|---|---|
| | | | | 10 | Assume 10 credits at start of example |
| 1 | 4/18/12 13:04:22 | Outgoing voice call: 5 minutes | −5 | 5 | |
| 2 | 4/18/12 13:15:48 | Outgoing text message | −1 | 4 | |
| 3 | 4/18/12 13:16:09 | Outgoing text message | −1 | 2 | |
| 4 | 4/18/12 13:05:55 | Incoming text message | +1 | 3 | |
| 5 | 4/18/12 13:05:55 | Incoming text message | +1 | 3 | |
| 5 | 4/18/12 13:08:02 | Incoming voice call: 3 minutes | +3 | 6 | |
| 6 | 4/18/12 15:04:11 | Outgoing text message to another user of app | 0 | 2 | No credits needed |
| 7 | 4/18/12 15:04:22 | Outgoing text message | −1 | 1 | |
| 8 | 4/18/12 20:26:22 | Outgoing text message | −1 | 0 | |
| 9 | 4/18/12 20:26:59 | Attempted outgoing text message | 0 | 0 | User attempt declined because no credits remain |
| 10 | 4/18/12 20:27:06 | Attempted outgoing voice call | 0 | 0 | User attempt declined because no credits remain |
| 10 | 4/18/12 20:27:11 | User purchases credits | 10 | 10 | User pays for credits by credit card |
| 11 | 4/18/12 20:27:31 | Outgoing voice call: 10 seconds | −1 | 9 | Minimum 1 credit per call |
| 12 | 4/20/12 08:43:35 | Incoming text message (deemed not to qualify for credit) | 0 | 9 | No credit awarded for non-qualifying incoming message |
| 13 | 4/23/12 15:04:11 | Outgoing text message to subscriber of ad-support text message service | 0 | 9 | No credits needed |
| 14 | 4/23/12 15:04:11 | Outgoing paid voice call | 0 | 9 | No credits needed |

The examples of Table #2 illustrate an embodiment in which credits can be earned and/or used for both text messages and voice calls, with each text message being worth one credit and each minute of a voice call being worth one credit. As described above, in various embodiments, each communication can be worth any number of credits, and the number of credits earned for an incoming communication having given duration, length, or size need not equal the number of credits used to send a communication having the same or similar characteristics. For example and without limitations, each incoming minute of voice calls can accrue more or fewer credits than are needed to send a minute of a voice call. Similarly, each incoming text message can accrue more or fewer credits than are needed to send a text message. Alternatively, as described herein, separate balances can be maintained for text credits and voice credits; a rate of exchange can be established to allow a user to exchange one for the other.

Figure 9:
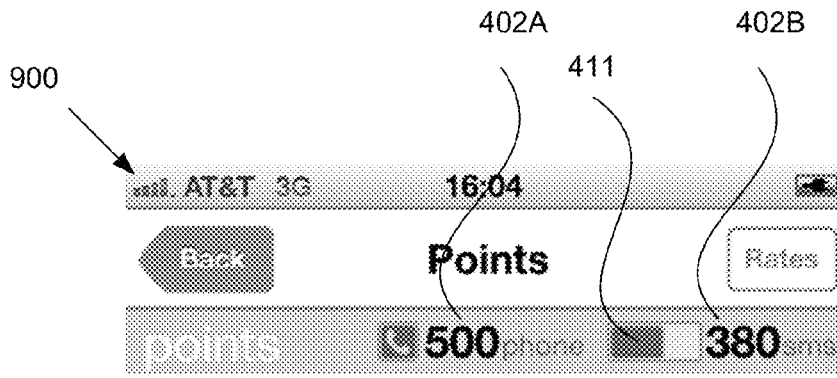
FIG. 9 is a screen shot depicting an example of a screen for displaying conversion rates according to at least one embodiment of the present invention.
Figure 9:
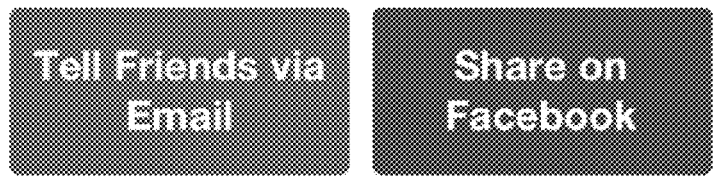

Referring now to FIG. 9, there is shown an example of a screen 900 for displaying conversion rates according to at least one embodiment of the present invention. In this example, credits are referred to as "points". Point earning rates 901 are shown (10 points per received SMS message, and 40 points per minute of received inbound voice calls). Point consumption rates 902 are also shown (10 points per outbound SMS message, 40 points per minute of outbound voice calls, and 100 points per minute of outbound voice calls). Link 903 to international rates may be provided; such international rates may be the same or different than domestic rates. As in FIG. 4B, indicators 402A and 402B reflect the current balance of voice credits and text message credit, and capacity indicator 411 is also included.

These rates are merely exemplary. One skilled in the art will recognize that the particular ratio and conversion rates among credits and various types of communications are merely illustrative, and that the invention can be practiced with any suitable ratio and/or conversion rate.

Furthermore, one skilled in the art will recognize that the particular events and effects depicted in the tables are provided merely for illustrative purposes, and are not intended to limit the scope of the invention to particular types of communications, methods of accruing or using credits, or the like.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment or embodiments.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for enforcing limits on electronic communications, comprising:
    at a processor, establishing a value representative of a non-monetary credit balance;
    at the processor, establishing a first conversion rate between non-monetary credits and incoming communications;
    at the processor, establishing a second conversion rate between non-monetary credits and outgoing communications;
    receiving an electronic communication at an electronic communication device;
    at the processor, responsive to receiving the electronic communication, increasing the value of the non-monetary credit balance according to the first conversion rate;
    at an input device of the electronic communication device, receiving input from a user requesting initiation of an electronic communication to a designated recipient via an electronic communication network; and
    at the processor, responsive to receiving the input from the user:
        determining whether the non-monetary credit balance is at least sufficient to initiate the requested electronic communication according to the second conversion rate; and
        responsive to the non-monetary credit balance being at least sufficient to initiate the requested electronic communication according to the second conversion rate:
            causing the communication device to transmit a signal to initiate the requested electronic communication via the electronic communications network; and
            decreasing the value of the non-monetary credit balance according to the second conversion rate.

2. The computer-implemented method of claim 1, further comprising:
    at the processor, responsive to receiving the input from the user:
        responsive to the non-monetary credit balance being insufficient to initiate the requested electronic communication according to the second conversion rate, declining the requested electronic transmission.

3. The computer-implemented method of claim 2, further comprising:
    at the processor, responsive to receiving the input from the user:
        responsive to the non-monetary credit balance being insufficient to initiate the requested electronic communication according to the second conversion rate, displaying output, at an output device of the electronic communication device, indicating that the requested electronic transmission has been declined.

4. The computer-implemented method of claim 1, wherein:
    establishing a value representative of a non-monetary credit balance comprises establishing a value representative of a non-monetary credit balance associated with a user;
    receiving an electronic communication at an electronic communication device comprises receiving an electronic communication addressed to the user;
    increasing the value of the non-monetary credit balance according to the first conversion rate comprises increasing the value of the non-monetary credit balance associated with the user; and
    decreasing the value of the non-monetary credit balance according to the second conversion rate comprises decreasing the value of the non-monetary credit balance associated with the user.

5. The computer-implemented method of claim 1, wherein:
    establishing a value representative of a non-monetary credit balance comprises establishing a value representative of a non-monetary credit balance associated with the electronic communication device;
    receiving an electronic communication at an electronic communication device comprises receiving an electronic communication addressed to the electronic communication device;
    increasing the value of the non-monetary credit balance according to the first conversion rate comprises increasing the value of the non-monetary credit balance associated with the electronic communication device; and decreasing the value of the non-monetary credit balance according to the second conversion rate comprises decreasing the value of the non-monetary credit balance associated with the electronic communication device.

6. The computer-implemented method of claim 1, wherein:
establishing a second conversion rate comprises establishing a conversion rate between non-monetary credits and free outgoing communications; and
causing the communication device to transmit a signal to initiate the requested electronic communication comprises causing the communication device to transmit a signal to initiate the requested electronic communication for free.

7. The computer-implemented method of claim 6, further comprising:
at the processor, responsive to receiving the input from the user:
responsive to the non-monetary credit balance being insufficient to initiate the requested electronic communication according to the second conversion rate, causing the communication device to transmit a signal to initiate the requested electronic communication at a charged rate, via the electronic communications network.

8. The computer-implemented method of claim 1, wherein:
establishing a second conversion rate comprises establishing a conversion rate between non-monetary credits and discounted outgoing communications; and
causing the communication device to transmit a signal to initiate the requested electronic communication comprises causing the communication device to transmit a signal to initiate the requested electronic communication at a discounted monetary rate.

9. The computer-implemented method of claim 8, further comprising:
at the processor, responsive to receiving the input from the user:
responsive to the non-monetary credit balance being insufficient to initiate the requested electronic communication according to the second conversion rate, causing the communication device to transmit a signal to initiate the requested electronic communication at a monetary rate higher than the discounted monetary rate, via the electronic communications network.

10. The computer-implemented method of claim 1, wherein increasing the value of the non-monetary credit balance according to the first conversion rate comprises:
determining whether the received electronic communication qualifies to increase the value of the non-monetary credit balance; and
responsive to the received electronic communication qualifying to increase the value of the non-monetary credit balance, increasing the value of the non-monetary credit balance according to the first conversion rate.

11. The computer-implemented method of claim 10, wherein determining whether the received electronic communication qualifies to increase the value of the non-monetary credit balance comprises determining whether the received electronic communication was transmitted via a paid communication channel.

12. The computer-implemented method of claim 1, wherein:
receiving an electronic communication comprises receiving a voice call;
receiving input from a user requesting initiation of an electronic communication comprises receiving input from a user to initiate a voice call; and
causing the communication device to transmit a signal to initiate the requested electronic communication comprises causing the communication device to initiate a voice call.

13. The computer-implemented method of claim 1, wherein the first conversion rate specifies that each incoming communication earns a fixed quantity of at least one non-monetary credit, and the second conversion rate specifies that each outgoing communication costs a fixed quantity of at least one non-monetary credit.

14. The computer-implemented method of claim 1, wherein the first conversion rate specifies that each incoming communication earns one non-monetary credit, and the second conversion rate specifies that each outgoing communication costs one non-monetary credit.

15. The computer-implemented method of claim 1, wherein the first conversion rate specifies that each incoming communication earns a quantity of non-monetary credits based on a length of the incoming communication, and the second conversion rate specifies that each outgoing communication costs a quantity of non-monetary credits based on a length of the outgoing communication.

16. The computer-implemented method of claim 1, wherein the first conversion rate specifies that each incoming communication earns a quantity of non-monetary credits based on a duration of the incoming communication, and the second conversion rate specifies that each outgoing communication costs a quantity of non-monetary credits based on a duration of the outgoing communication.

17. The computer-implemented method of claim 1, wherein the first conversion rate specifies that each incoming communication earns a quantity of non-monetary credits based on a size of the incoming communication, and the second conversion rate specifies that each outgoing communication costs a quantity of non-monetary credits based on a size of the outgoing communication.

18. The computer-implemented method of claim 1, wherein the first conversion rate specifies that each incoming communication earns a quantity of non-monetary credits based on bandwidth consumed by the incoming communication, and the second conversion rate specifies that each outgoing communication costs a quantity of non-monetary credits based bandwidth consumed by the outgoing communication.

19. The computer-implemented method of claim 1, wherein the first conversion rate equals the second conversion rate.

20. The computer-implemented method of claim 1, wherein the first conversion rate does not equal the second conversion rate.

21. A computer-implemented method for enforcing limits on electronic communications, comprising:
at a processor, establishing a value representative of a non-monetary credit balance;
receiving an electronic communication at an electronic communication device;
at the processor, responsive to receiving the electronic communication, increasing the value of the non-monetary credit balance;
at an input device of the electronic communication device, receiving input from a user requesting initiation of an electronic communication to a designated recipient via an electronic communication network; and at the processor, responsive to receiving the input from the user:
  determining whether the non-monetary credit balance is non-zero; and
  responsive to the non-monetary credit balance being non-zero:
    causing the communication device to transmit a signal to initiate the requested electronic communication via the electronic communications network; and
    decreasing the value of the non-monetary credit balance.

22. A computer-implemented method for enforcing limits on electronic communications, comprising:
  at a processor, establishing a plurality of values, each value being representative of a non-monetary credit balance corresponding to a different type of communications;
  receiving a communication at an electronic communication device, the communication having a type;
  at the processor, increasing the value of the non-monetary credit balance corresponding to the type of the received communication;
  at an input device of the electronic communication device, receiving input from a user requesting initiation of a communication to a designated recipient via an electronic communication network, the requested message being of a type; and
  at the processor, responsive to receiving the input from the user:
    determining whether the values of the monetary credit balances are at least sufficient to initiate the requested electronic communication; and
    responsive to the values of the monetary credit balances being at least sufficient to initiate the requested electronic communication:
      causing the communication device to transmit a signal to initiate the requested electronic communication via the electronic communications network; and
      decreasing at least one value of at least one non-monetary credit balance.

23. The method of claim 22, further comprising:
  at the processor, responsive to a signal indicating an exchange between at least a portion of one non-monetary credit balance and at least a portion of another non-monetary credit balance:
    decreasing the value of the non-monetary credit balance corresponding to a first type; and
    increasing the value of the non-monetary credit balance corresponding to a second type, wherein the amount of the increase is determined based on the amount of the decrease and further based on a predetermined exchange rate between unit measures of the communication types associated with the first and second non-monetary credit balances.

24. The method of claim 22, wherein:
  determining whether the values of the monetary credit balances are at least sufficient to initiate the requested electronic communication comprises determining whether the non-monetary credit balance corresponding to the type of the requested communication is at least sufficient to initiate the requested electronic communication; and
  decreasing at least one value of at least one non-monetary credit balance comprises decreasing the non-monetary credit balance corresponding to the type of the requested communication.

25. The method of claim 22, further comprising:
  determining whether the values of the monetary credit balances are at least sufficient to initiate the requested electronic communication comprises determining whether at least one of the monetary credit balances has a value at least sufficient to initiate the requested electronic communication, based on a predetermined exchange rate between non-monetary credit balances; and
  decreasing at least one value of at least one non-monetary credit balance comprises decreasing a non-monetary credit balance corresponding to a type other than type of the requested communication, based on the predetermined exchange rate between non-monetary credit balances.

26. The method of claim 22, further comprising:
  determining whether the values of the monetary credit balances are at least sufficient to initiate the requested electronic communication comprises determining whether the aggregate of the monetary credit balances corresponds to a value at least sufficient to initiate the requested electronic communication, based on a predetermined exchange rate between non-monetary credit balances; and
  decreasing at least one value of at least one non-monetary credit balance comprises decreasing a plurality of non-monetary credit balances, based at least in part on the predetermined exchange rate between non-monetary credit balances.

27. A computer-implemented method for enforcing limits on electronic communications, comprising:
  at a processor, establishing a value representative of a non-monetary credit balance;
  displaying the non-monetary credit balance on a display device of the electronic communication device;
  receiving an electronic communication at an electronic communication device;
  responsive to receiving the electronic communication, causing the display device to increase the displayed value of the non-monetary credit balance;
  at an input device of the electronic communication device, receiving input from a user requesting initiation of an electronic communication to a designated recipient via an electronic communication network; and
  at the processor, responsive to receiving the input from the user:
    determining whether the non-monetary credit balance is non-zero; and
    responsive to the non-monetary credit balance being non-zero:
      causing the communication device to transmit a signal to initiate the requested electronic communication via the electronic communications network; and
      causing the display device to decrease the displayed value of the non-monetary credit balance.

28. A non-transitory computer program product for enforcing limits on electronic communications, comprising:
  a non-transitory computer-readable storage medium; and
  computer program code, encoded on the medium, configured to cause at least one processor to perform the steps of:
    establishing a value representative of a non-monetary credit balance;
    establishing a first conversion rate between non-monetary credits and incoming communications;

establishing a second conversion rate between non-monetary credits and outgoing communications;

responsive to receiving an electronic communication at an electronic communication device, increasing the value of the non-monetary credit balance according to the first conversion rate;

responsive to receiving input from a user requesting initiation of an electronic communication to a designated recipient via an electronic communication network:

determining whether the non-monetary credit balance is at least sufficient to initiate the requested electronic communication according to the second conversion rate; and responsive to the non-monetary credit balance being at least sufficient to initiate the requested electronic communication according to the second conversion rate:

causing the communication device to transmit a signal to initiate the requested electronic communication via the electronic communications network; and decreasing the value of the non-monetary credit balance according to the second conversion rate.

29. The non-transitory computer program product of claim 28, wherein the computer program code is further configured to cause at least one processor to, responsive to the non-monetary credit balance being insufficient to initiate the requested electronic communication according to the second conversion rate, decline the requested electronic transmission.

30. The non-transitory computer program product of claim 28, wherein:

receiving an electronic communication comprises receiving a voice call;

the received input comprise input to initiate a voice call; and the computer program product configured to cause at least one processor to transmit a signal to initiate the requested electronic communication comprises computer program product configured to cause at least one processor to initiate a voice call.

31. A non-transitory computer program product for enforcing limits on electronic communications, comprising:

a non-transitory computer-readable storage medium; and computer program code, encoded on the medium, configured to cause at least one processor to perform the steps of:

establishing a value representative of a non-monetary credit balance;

responsive to receiving an electronic communication at an electronic communication device, increasing the value of the non-monetary credit balance;

responsive to receiving input from a user requesting initiation of an electronic communication to a designated recipient via an electronic communication network:

determining whether the non-monetary credit balance is non-zero; and responsive to the non-monetary credit balance being non-zero:

causing the communication device to transmit a signal to initiate the requested electronic communication via the electronic communications network; and decreasing the value of the non-monetary credit balance.

32. A system for enforcing limits on electronic communications, comprising:

a processor, configured to:

establish a value representative of a non-monetary credit balance;

establish a first conversion rate between non-monetary credits and incoming communications; and establish a second conversion rate between non-monetary credits and outgoing communications;

a storage device, communicatively coupled to the processor and configured to store the value representative of the non-monetary credit balance;

a communications component of an electronic communications device, communicatively coupled to the processor and configured to transmit and receive electronic communications;

an input device, communicatively coupled to the processor and configured to receive input from a user requesting initiation of an electronic communication to a designated recipient via an electronic communication network;

wherein:

responsive to the communications component receiving an electronic communication, the processor is configured to increase the value of the non-monetary credit balance according to the first conversion rate;

responsive to the input device receiving input from a user requesting initiation of an electronic communication to a designated recipient via an electronic communication network:

the processor is configured to determine whether the non-monetary credit balance is at least sufficient to initiate the requested electronic communication according to the second conversion rate; and responsive to the non-monetary credit balance being at least sufficient to initiate the requested electronic communication according to the second conversion rate, processor is configured to:

cause the communications component to transmit a signal to initiate the requested electronic communication via the electronic communications network; and cause the storage device to decrease the value of the non-monetary credit balance according to the second conversion rate.

33. The system of claim 32, wherein the processor is further configured to, responsive to the non-monetary credit balance being insufficient to initiate the requested electronic communication according to the second conversion rate, decline the requested electronic transmission.

34. The system of claim 32, wherein:

the communications component is configured to receive and send voice calls;

the received input comprise input to initiate a voice call; and causing the communications component to transmit a signal to initiate the requested electronic communication comprises causing the communications component to initiate a voice call.

35. A system for enforcing limits on electronic communications, comprising:

a processor, configured to establish a value representative of a non-monetary credit balance:

a storage device, communicatively coupled to the processor and configured to store the value representative of the non-monetary credit balance;

a communications component of an electronic communications device, communicatively coupled to the processor and configured to transmit and receive electronic communications;
an input device, communicatively coupled to the processor and configured to receive input from a user requesting initiation of an electronic communication to a designated recipient via an electronic communication network
wherein:
responsive to the communications component receiving an electronic communication, the processor is configured to increase the value of the non-monetary credit balance;
responsive to the input device receiving input from a user requesting initiation of an electronic communication to a designated recipient via an electronic communication network:
  the processor is configured to determine whether the non-monetary credit balance is non-zero; and
  responsive to the non-monetary credit balance being non-zero, the processor is configured to:
    cause the communications component to transmit a signal to initiate the requested electronic communication via the electronic communications network; and
    cause the storage device to decrease the value of the non-monetary credit balance.

* * * * *